INVENTORS
W. H. DuSHANE
S. A. OLSEN

United States Patent Office 3,040,596
Patented June 26, 1962

3,040,596
CONTROL MECHANISM
Wallace H. Du Shane, Waterloo, and Sydney A. Olsen, Cedar Falls, Iowa, assignors to Deere & Company, Moline, Ill., a corporation of Delaware
Filed July 21, 1960, Ser. No. 44,353
6 Claims. (Cl. 74—482)

This invention relates to a control mechanism and more particularly to such control mechanism as applied to the dual control of the internal combustion engine, for example, of a vehicle.

The invention finds its principal utility in the application thereof to an agricultural tractor, which is conventionally controlled by a governor-regulated engine, the settings of which may be changed by a hand lever. Unlike the typical automobile, agricultural tractors have not heretofore been commercially equipped on a wide scale with foot feeds or accelerators, because, in general, the two types of speed regulation (hand lever and foot feed) were thought to be largely mutually exclusive. However, the modern agricultural tractor has become more powerful and its uses more universal, and the combination of the foot accelerator with the hand lever control has demonstrated advantages that are worth exploiting.

It is accordingly one of the principal objects of the present invention to provide a novel and improved combination dual control for an adjustable speed-regulating device such as that used to regulate the speed of a power plant, such as an internal combustion engine as used on vehicles in the tractor class; although, various aspects of the invention will have application to other vehicles and to the control of other types of regulators. It is an object of the invention to provide a coordinated control mechanism in which a selected speed of the regulator may be set by the hand lever and may be varied at will by the accelerator in both directions from the set speed; that is to say, the set speed may be either increased or decreased. In this respect, it is a feature of the invention to provide the design with means whereby both increase and decrease by the foot feed may be accomplished without disturbing the position of the hand lever and in such manner that when the foot feed returns to neutral, the speed selected by the hand lever will be restored. Specifically, it is an object of the invention to provide control linkage in which a pedal is mounted on a support having a double fulcrum in which the pedal normally rests on both fulcra but is capable of rocking about either, according to the direction and speed change desired, thereby being capable of modifying the control linkage without changing the setting of the hand lever. The mount for the pedal features a bracket having two fulcra spaced apart and accommodating therebetween a recess which in turn houses at least in part a biasing means for maintaining the pedal in its normal position from which it is shiftable to either side as it rocks about one or the other of the fulcra.

The foregoing and other important objects and desirable features inherent in and encompassed by the invention will become apparent as a preferred embodiment thereof is disclosed, by way of example, in the ensuing description and accompanying sheet of drawings, the several figures of which are described below.

Figure 1:
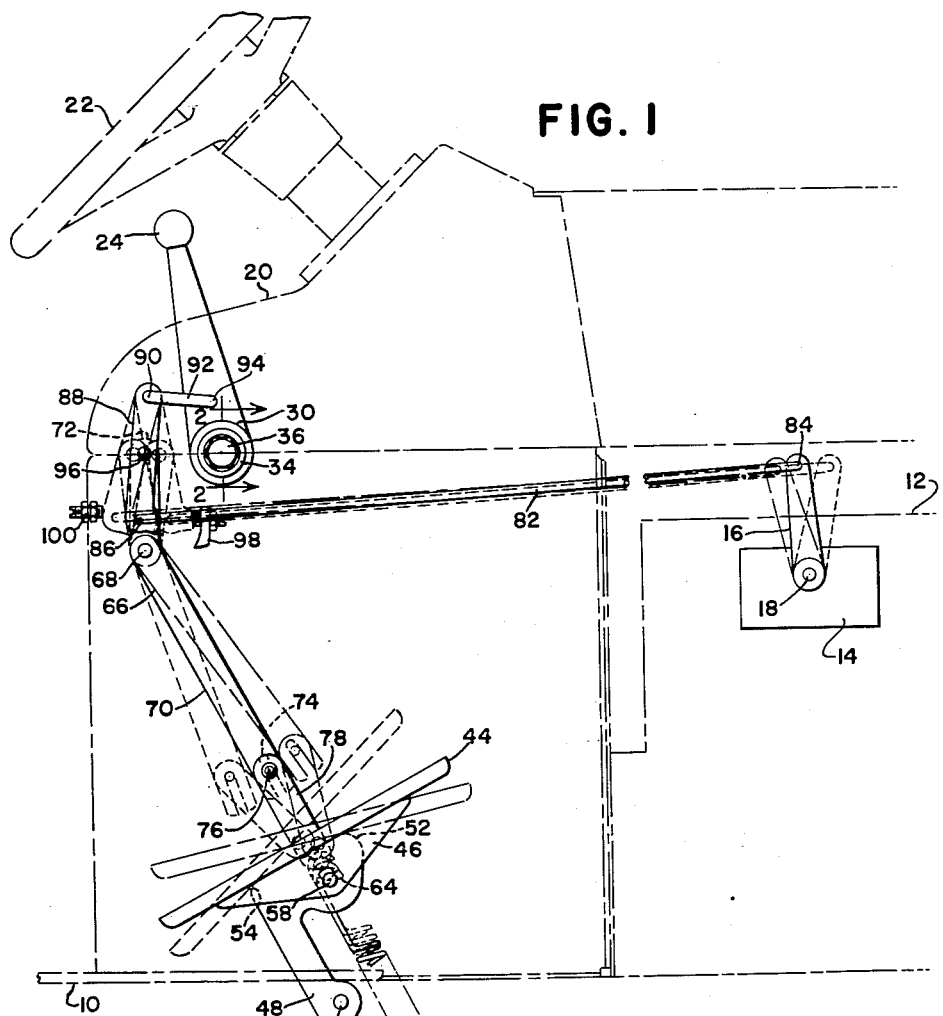
FIG. 1 is an elevation of the control mechanism, showing the same in full lines in a status in which the pedal is in a neutral or normal position and the hand lever is in an intermediate position, portions of the tractor being shown in broken lines and additional positions of the control linkage being also shown in broken lines.
Figure 2:
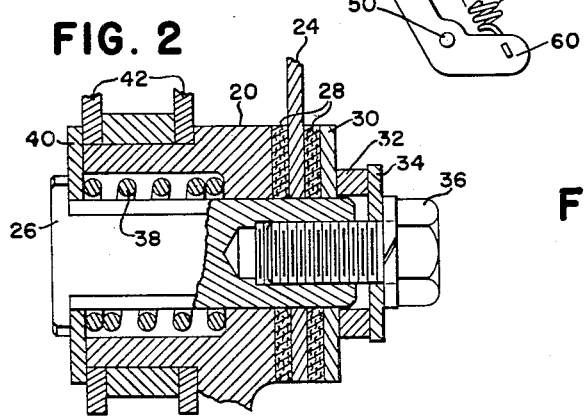
FIG. 2 is an enlarged section on the line 2—2 of FIG. 1.
Figure 3:
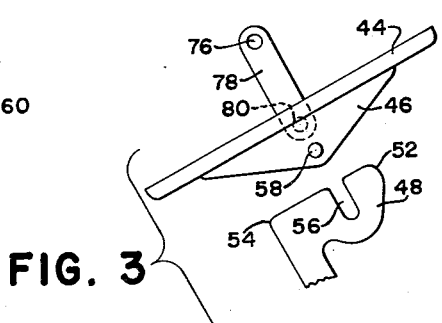
FIG. 3 is an "exploded" view of the pedal and a portion of the mount therefor.

The environment chosen for purposes of illustration is that of a typical agricultural tractor having a main frame 10 which affords a support for the structure to be presently described. The tractor further includes an internal combustion engine 12, the speed of which is under control of a speed-regulating means such as a governor shown generally at 14. The governor is adjustable by means of an arm 16 keyed to a governor shaft 18 which enters the governor and performs its conventional function, the details of which are familiar to those versed in the art and therefore require no elaboration.

The tractor body 10 includes suitable styling or typical sheet metal structure including a console or instrument panel 20 on which the various controls, including a steering wheel 22 and a speed regulating lever 24 are mounted.

The mounting of the lever 24 includes a stub shaft 26 on which the lever 24 is loosely mounted; although, the position of the lever 24 is capable of being maintained as to angular adjustment by friction means in the form of friction washers 28 received at opposite sides of the lever 24 and compressed between the support 20 and an external washer 30 through the medium of a spacer 32, an additional washer 34, and a cap screw 36 which is threaded into the shaft 26. The support 20 is recessed as shown to accommodate a coiled compression spring 38 which acts against the head of the shaft 26 via a left hand washer 40. Because of the frictional forces imposed by the frictional washers 28, the lever 24 can be forcibly moved but once set is capacitated to retain its position until deliberately reset. Additional levers, not important here, are shown at 42 as being included in the mounting. As will be brought out below, the hand lever 24 has as its main function the setting of a selected speed in the governor 14. In the absence of structure according to the present invention, the hand lever 24 would be connected directly to the governor arm 16.

The combination accelerator-decelerator for the vehicle is here shown as comprising a pedal 44 to which are rigidly secured a pair of depending ears 46 which straddle the opposite sides of a pedal mount or bracket 48. This bracket may be rigidly secured to the tractor body as by securing means 50. The upper surface of the bracket or mount is provided in a generally flat condition which normally supports or receives the undersurface of the pedal 44, and the front and rear ends of the upper surface of the mount are rounded respectively at 52 and 54 to provide a pair of spaced apart fulcra, separated by a recess or slot 56 which normally accommodates a transverse pin 58 which is rigidly carried by and spans the pedal ears 46. The upper portion of the mount is open in communication with the slot or recess 56, and the mount is extended downwardly and forwardly to have an anchor 60 to which is connected one end of a coiled tension spring 62 which has its opposite end connected at 64 to the pedal pin 58. The spring thus constitutes biasing means secured between the mount and the pedal for holding the pedal in its normal position so that its undersurface rests flatwise on the top surface of the mount 48. The spring 62 is of course yieldable to permit rocking of the pedal either fore or aft; or clockwise or counterclockwise, as indicated by the broken-line positions in FIG. 1. That is to say, when downward and rearward pressure is applied to the pedal, it will rock rearwardly about the rear fulcrum 54, moving away from the fulcrum 52 and tensioning the spring 62 as the cross pin 58 moves upwardly in the slot 56. The guiding arrangement between the slot 56 and pin 58 is such as to prevent fore and aft escape of the pedal from the mount. Conversely, when the pedal is depressed in a forward direction, it will rock about the forward fulcrum 52, or in a clockwise direction, the function of the parts 56—58 being again as described above and the spring 62 again functioning to return the pedal to its neutral position when pressure is reelased therefrom.

The double fulcrum arrangement is utilized as means for mounting the pedal for movement in both accelerating and decelerating directions. Deceleration is incurred when the pedal is depressed at its rear end so as to rock about the rear fulcrum 54. Acceleration occurs when the pedal is rocked about the fulcrum 52.

For the purpose of interconnecting the hand lever 24 and pedal 44, the invention provides differential linkage including a bell crank 66 rockable on the support 10 via a transverse shaft 68. The bell crank has first and second arms 70 and 72, the former being slotted at 74 to receive a pin 76 carried by an arm 78 which is rigidly connected to the pedal 44 at a portion thereof intermediate the fulcra 52 and 54. In the present case, the arm 78 is rigidly secured to a stub shaft 80 which in turn is rigidly secured to the pedal in vertically spaced relation to the cross pin 58. Thus, as the pedal is rocked about the fulcrum 52, for example, the arm 78 will travel in a forward or clockwise direction. The motion will be the reverse when the pedal is rocked about the rear fulcrum 54. Because of the pin and slot connection at 74—76, by which the linkage receives input force from the pedal, the bell crank 70 will also be rocked, turning in a counterclockwise direction as the pedal is rocked about the fulcrum 52 and turning in a clockwise direction as the pedal is rocked about the fulcrum 54.

Since the bell crank is mounted on the support on the rockshaft 68, the upper or second arm 72 thereof will move fore and aft, and as it does so it is capable of transmitting motion to a speed control link 82 which is pivotally connected at its forward end at 84 to the governor control arm 16 and which is pivotally connected at its rear end at 86 to the lower end of an upright lever 88 which is pivotally connected at 90 to a short link 92 which in turn is pivotally connected at 94 to the hand lever 24 for transmitting input force from the lever to the linkage. The lever 88 is pivotally connected intermediate its ends at 96 to the upper end of the bell crank arm 72. Consequently, as the pedal 44 is rocked in one direction or the other, the bell crank transmits motion to the lever 88 which, because of the set position of the hand lever 24, pivots about the pivot 90 as a reaction point so that its lower end swings fore or aft, as the case may be, to transmit linear output force to the link 82 which, as already described, is connected to the governor control arm 16. Fore-and-aft angular movement of the lever 88 is limited by front and rear stops 98 and 100, both of which may be adjustable as shown.

An understanding of the operation of the arrangement will be clear when it is recognized that forward or clockwise movement of the governor arm 16 represents a speed decrease, and rearward or counterclockwise movement of this arm represents a speed increase. The hand lever 24 is illustrated as being in a position just short of the maximum speed position that it is capable of occupying. Hence, with the pedal 44 in its neutral or normal position as maintained by the tension spring 62, the bell crank 66 will be immobilized, and the pivot 96 will represent a temporarily fixed fulcrum or reaction point for the lever 88. Hence, if it is desired to increase the speed—to move the governor arm 16 forwardly—the lever 24 is moved forwardly, turning about the axis of the shaft 26 and acting through the input connection or short link 92 to rock the lever 88 in a clockwise direction about the temporarily fixed pivot 96, thereby causing the lower end of the lever 88 to swing rearwardly so as to act through the link 82 to move the governor arm 16 rearwardly or in a counterclockwise direction. The converse will be true when the lever 24 is rocked rearwardly or in a counterclockwise direction, which will, of course, result in a decrease in engine speed.

Once the position of the hand lever 24 is set, the speed of the engine may be increased or decreased by controlling the governor 14 via the foot pedal 44 without disturbing the position of the hand lever. For example, with the hand lever 24 set as shown, let it be assumed that the operator wishes to increase engine speed. He rocks the pedal 44 downwardly and forwardly about the fulcrum 52 so as to rock the bell crank 66 in a counterclockwise direction about its pivot 68. The upper arm of the bell crank then swings the lever 88 rearwardly, the lever now swinging about the pivot 90 as a temporarily fixed pivot, since the lever 88 is connected to the link 92 and this in turn is connected to the lever 24 which is releasably held by the friction means 28—30. Since the lever 88 swings rearwardly, it draws rearwardly on the link 82 and effects a speed increase as desired. Conversely, depression of the pedal 44 in a rearward or counterclockwise direction, in which case the pedal rocks about the fulcrum 54, causes reverse rocking of the bell crank 66 and reverse rocking of the lever 88 about the pivot 90 so that the link 82 is moved forwardly to rock the governor arm forwardly or in a speed-decrease direction. When manual pedal pressure is released, the spring 62 returns the pedal to its normal position.

As will be seen, the invention is characterized largely by its extreme simplicity and flexibility of operation, giving the operator optional control of the governor 14 via either the hand lever 24 or pedal 44. What is significant is the fact that the pedal 44 may be used to both increase and decrease speed without disturbing the position of the hand lever 24. At the same time, the setting of the governor 14 may be selectively changed by setting the position of the hand lever.

Features and advantages in addition to those categorically enumerated will readily occur to those versed in the art, as will many modifications and alterations in the preferred embodiment disclosed, all of which may be achieved without departure from the spirit and scope of the invention.

What is claimed is:

1. For a variable-speed power plant having an adjustable speed regulator, the combination of: a support; a hand-operated controller selectively movable back and forth on the support in a regulating range and releasably settable at any selected temporarily set position in said range; a pedal mount on the support and having first and second spaced apart fulcra; a pedal having temporarily fixed a neutral position resting on both fulcra and movable selectively to opposite sides of said neutral position by rocking about one fulcrum and away from the other and vice versa; yielding means normally holding the pedal against both fulcra to secure said temporarily fixed neutral position; and differential linkage having input connections respectively to the pedal and the controller and an output connection to the regulator and operative, when receiving input from controller movement, to react on the temporarily fixed pedal and to act on the regulator, and, when receiving input from pedal movement, to react on the temporarily set controller and to act on the regulator for enabling adjustment of the regulator by either the pedal or the controller independently of the other.

2. The invention defined in claim 1, in which: the pedal mount has a recess therein between the fulcra; and the biasing means is contained at least in part in said recess and is connected to the pedal at a portion of the pedal intermediate the fulcra.

3. The invention defined in claim 1, in which: the differential linkage includes a bell crank rockable on the support and having first and second arms; means pivotally connecting the first arm to the pedal and constituting one of said input connections to enable rocking of the bell crank by rocking of the pedal in either direction; a lever pivotally connected at one end to the controller and constituting the other of said input connection; a link pivotally connected to the other end of the lever and extending to and connected to the regulator for establishing said output connection; and means connecting the second arm of the bell crank to the lever intermediate the ends of said lever.

4. The invention defined in claim 1, in which: the differential linkage includes a bell crank rockable on the support and having first and second arms; means pivotally connecting the first arm to the pedal and constituting one of said input connections to enable rocking of the bell crank by rocking of the pedal in either direction; a lever pivotally connected at one portion thereof to the controller and constituting the other of said input connection; a link pivotally connected to the lever at a second portion thereof and extending to and connected to the regulator for establishing said output connection; and means connecting the second arm of the bell crank to the lever at a third portion of said lever.

5. The invention defined in claim 1, in which: the differential linkage includes a bell crank rockable on the support and having first and second arms; pivot and slot means connecting the first arm to the pedal and constituting one of said input connections to enable rocking of the bell crank by rocking of the pedal in either direction; a lever pivotally connected at one portion thereof to the controller and constituting the other of said input connection; a link pivotally connected to the lever at a second portion thereof and extending to and connected to the regulator for establishing said output connection; and means connecting the second arm of the bell crank to the lever at a third portion of said lever.

6. For a variable-speed power plant having an adjustable speed regulator, the combination of: a support; a hand-operated controller selectively movable back and forth on the support in a regulating range and releasably settable at any selected temporarily set position in said range; a pedal mount on the support and having first and second spaced apart fulcra; a pedal having temporarily fixed a neutral position resting on both fulcra and movable selectively to opposite sides of said neutral position by rocking about one fulcrum and away from the other and vice versa; yielding means normally holding the pedal against both fulcra to secure said temporarily fixed neutral position; an arm rigid on the pedal at a portion thereof between the fulcra; and differential linkage having input connections respectively to the pedal arm and the controller and an output connection to the regulator and operative, when receiving input from controller movement, to react on the temporarily fixed pedal and to act on the regulator, and, when receiving input from pedal movement, to react on the temporarily set controller and to act on the regulator for enabling adjustment of the regulator by either the pedal or the controller independently of the other.

References Cited in the file of this patent

UNITED STATES PATENTS

| | | |
|---|---|---|
| 2,499,280 | Redmon | Feb. 28, 1950 |
| 2,821,091 | Benner | Jan. 28, 1958 |
| 2,936,867 | Perry | May 17, 1960 |